United States Patent Office 2,988,048
Patented June 13, 1961

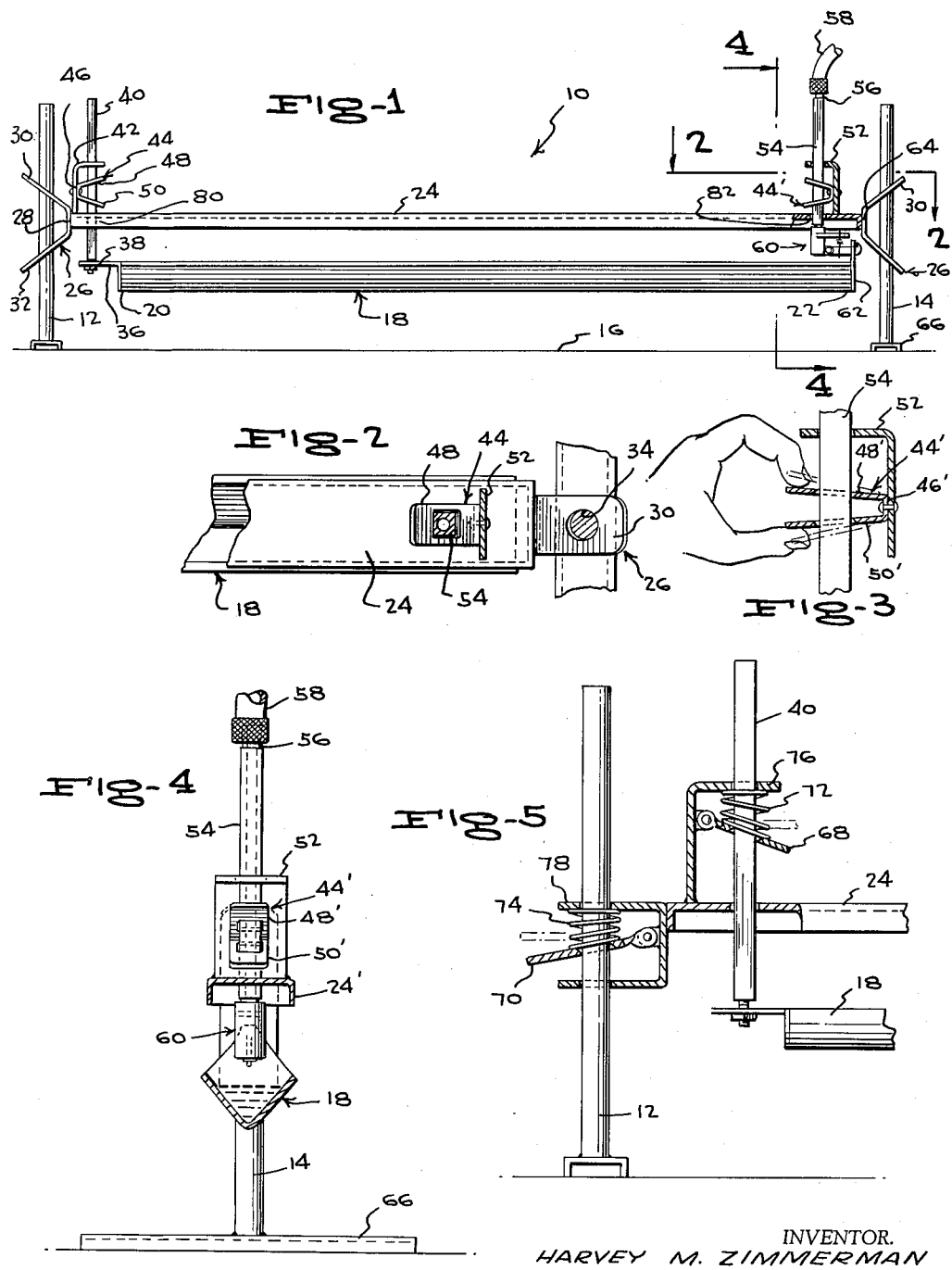

2,988,048
POULTRY WATERER
Harvey M. Zimmerman, R.F.D. 3, Ephrata, Pa.
Filed Feb. 13, 1959, Ser. No. 793,033
2 Claims. (Cl. 119—81)

The present invention relates to a poultry waterer of the simple trough type.

In the poultry industry, it is generally an efficient practice to raise poultry in relatively small individual flocks, the birds of one flock being hatched at substantially the same time and being of approximately the same size. It has been found expedient, for reasons of disease control and other reasons, to receive the birds into a confined area when they are a day or two of age and to keep the birds in that area until they are ready for market or transfer to laying houses. The flocks must be provided with fresh water at all times and it is an important feature in the raising of poultry for profit that each bird of the flock be provided with fresh water to drink. Proper conversion of poultry feed to poultry flesh requires that the drinking water be provided to each bird as efficiently as possible. It has been found that as the birds of a flock of poultry grow larger, each bird will drink more water if the height of the watering trough is raised in accordance with the growth of the bird.

Watering troughs which are adjustable in height, as heretofore proposed, are generally cumbersome and do not lend themselves to ready adjustment to accommodate the change in size of a growing bird. Other troughs proposed are of such size as to be unwieldly and to require considerable time and labor in the assembly and disassembly for cleaning.

An object of the present invention is to provide a watering trough or poultry waterer which is readily and easily adjusted to accommodate the change in size of a growing bird.

Another object of the present invention is to provide a poultry waterer which lends itself to assembly and disassembly with ease and facility, one sturdily constructed, one simple in structure, one having an automatic filling means, and one which is economically feasible.

These and other objects and advantages of the present invention will be fully apparent from the following description when taken in conjunction with the annexed drawing, in which:

FIGURE 1 is an elevational view of the poultry waterer according to the present invention;

FIGURE 2 is a fragmentary view taken on the line 2—2 of FIGURE 1;

FIGURE 3 is a fragmentary view partially in section showing the fingers of a hand of a user applying pressure to the height adjustment means in order to free it from one position on the post of the waterer;

FIGURE 4 is a view, on an enlarged scale, taken on the line 4—4 of FIGURE 1; and FIGURE 5 is a fragmentary elevational view, partially in section, showing a modified form of the waterer according to the present invention.

Referring in greater detail to the drawing in which like numerals indicate like parts throughout the several views, in FIGURE 1, the reference numeral 10 designates generally the poultry waterer according to the present invention. The waterer 10 includes a pair of laterally spaced standards 12 and 14, each having their lower ends adapted to rest upon a supporting surface, as at 16. The horizontally disposed trough 18 is disposed between the standards 12 and 14 intermediate the ends thereof and has one end 20 adjacent to and spaced from the standard 12 and has the other end 22 adjacent to and spaced from the standard 14.

An overhead support 24 extends between the standards 12 and 14 in spaced relation above the trough 18 and aligned therewith. The support 24 is of inverted U-shaped cross-sectional configuration, as shown most clearly in FIGURE 4.

Mounting means is provided on each end of the support 24 frictionally and releasably engaging the adjacent standard 12, 14. Such mounting means, in FIGURES 1 to 4, consists in a resilient member 26 having a bight 28 and legs 30 and 32 projecting in diverging relation from the bight 28. The bight 28 of each member 26 is fixedly secured to the adjacent end of the support 24 with the legs 30 and 32 arranged in vertical spaced relation.

The legs 30 and 32 are provided with aligned holes receiving the respective standard 12 or 14. One such hole is shown in FIGURE 2 and designated by the reference numeral 34, this being the hole in the uppermost leg 30 of the member 26 associated with the standard 14.

Each hole 34 in the legs 30 and 32 of the members 26 is formed at an angle so as to provide a sharp biting edge frictionally engaging the adjacent part of the respective standard 12 or 14.

The trough end 20 is closed by the short leg of an L-shaped bracket 36 having its longer leg horizontally disposed and provided with an opening through which extends a securing bolt 38 projecting from the lower end of a post 40. An inverted L-shaped bracket 42 has the free end of its long leg fixedly secured to one end of the support 24 and its short leg disposed horizontally and provided with an opening through which is slidable the post 40.

A gripping element 44 having a bight 46 and legs 48 and 50 projecting in diverging relation from the bight 46 is secured by its bight 46 to the long leg of the bracket 42 intermediate the ends thereof. The legs 48 and 50 are provided with aligned openings through which extend the post 40, the openings having beveled edges in order to better grip the post 40 when the legs 48 and 50 are permitted to assume their diverged position, as in FIGURE 1.

Another bracket 52 is positioned inwardly of the other end of the support 24 and has the free end of its long leg fixedly secured to the support 24.

Another gripping element 44', having a bight 46 and diverging legs 48' and 50' projecting from the bight 46', is secured to the vertical long leg of the bracket 52 in a position so as to face the other element 44 on the first-mentioned end of the support 24.

The legs 48' and 50' of the element 44' are resilient and are provided with square openings receiving a hollow square post 54 which serves as the inlet conduit for the trough 18. The upper end portion 56 of the post 54 is threaded and adapted for connection to a flexible hose leading to a source of water under pressure. Such hose is shown in FIGURE 1 and designated by the numeral 58.

On the lower end of the post 54 is secured a valve assembly 60 of conventional construction and actuated to closed position by the weight of the water in the trough 18. The trough end 22 is provided with an upstanding plate 62 closing that end of the trough and having an aperture therein receiving the free end of the valve actuating arm 64 of the valve assembly 60.

The square openings provided in the resilient legs 48' and 50' are cut at an angle so as to provide cutting edges which dig into the post 54 in order to grip the same and support the trough 18 in the horizontal position without a chance of slipping downwardly.

The lower end of each of the standards 12 and 14 is provided with a foot element 66 extending transversely with respect to the trough 18 in order to provide optimum support for the waterer 10 when resting upon its supporting surface.

In FIGURE 5, a modified form of the invention is shown in which the gripping means supporting the trough 18 below the support 24, and the other gripping means supporting the support 24 on the standard 12, embodies a single downwardly sloping plate element 68 and 70, respectively, pivotally connected to the support 24 for movement from the downwardly sloping position to substantially horizontal positions, as shown in dotted lines. The plate elements 68, 70, provided with apertures receiving the post 40 and standard 12, the edges of the apertures being cut at a slant so as to dig into the post 40 and standard 12. Springs 72 and 74 bias the plate elements 68 and 70 to their downwardly sloping positions in gripping engagement with the respective post 40 and standard 12. The springs 72 and 74 have one end bearing against the adjacent plate element 68, 70 and have the other end bearing on the other side of a horizontally disposed bracket member 76, 78, respectively. The posts 40, 54 extend slidably through holes 80, 82 in the support 24, and also through holes in the horizontal legs of the brackets 36, 52, respectively.

In use, the waterer 10 is positioned within the enclosure where poultry is raised and the hose 58 is connected to a source of water under pressure. At first the trough 18 is positioned close to the supporting surface 16 while the birds of the poultry flock are of small size and as the birds grow in size and height, the trough 18 and support 24 are raised on the standards 12 and 14 and the space between the trough 18 and the support 24 is increased to accommodate the size of the birds' heads. The adjustment of the support 24 upwardly and downwardly relative to the standards 12 and 14 is accomplished by grasping in the fingers the legs 30 and 32 of the gripping members 26 on each end of the support 24 and shifting such resilient legs toward each other so as to free them from gripping engagement with the standards 12 and 14. Similarly, the trough 18 is adjusted relative to the support 24 by grasping in the fingers the projecting end portions of the resilient legs 48, 50, 48', and 50' of the gripping elements 44, 44' and shifting such legs toward each other so as to free themselves from gripping engagement with the posts 40 and 54.

In the embodiment shown in FIGURE 5, the trough 18 is adjusted relative to the support 24 by lifting of the plate element 68 against the compression of the spring 72. The support 24 is adjusted relative to the standard 12 by lifting of the plate element 70 against compression of the spring 74. This frees the trough 18 for movement of the post 40 and frees the support from the standard 12.

While the post 54 is illustrated and described as being square in cross section, the post 54 may be of any other cross sectional configuration except round. It may be triangular, oval, or hexagonal, for instance, with the hole 82 and the openings in the elements 44' and the bracket 52 conformably shaped thereto in order that the post 54 be secured against rotation relative to the trough 18.

It will be seen, therefore, that the waterer 10 of the present invention is of simple construction, readily and easily disassembled and assembled for cleaning purposes and one which is highly effective in action.

What is claimed is:

1. In a poultry waterer, a pair of laterally spaced standards each having its lower end adapted to rest upon a supporting surface, a horizontally disposed trough positioned between said standards between the ends thereof and having one end adjacent to and spaced from one of said standards and having the other end adjacent to and spaced from the other of said standards, an overhead support extending between said standards, mounting means on each end of said support and frictionally and releasably engaging the adjacent standard, a post on each end of said trough and extending slidably through said support, and other mounting means embodying an element having a bight and a pair of legs projecting in a diverging relation from said bight on said support adjacent each end thereof and having the bight fixedly attached to said support and having the legs frictionally and releasably engaging the adjacent post.

2. In a poultry waterer, a pair of laterally spaced standards each having its lower end adapted to rest upon a supporting surface, a horizontally disposed trough positioned between said standards between the ends thereof and having one end adjacent to and spaced from one of said standards and having the other end adjacent to and spaced from the other of said standards, an overhead support extending between said standards, mounting means on each end of said support and frictionally and releasably engaging the adjacent standard, a post on each end of said trough and extending slidably through said support, and other mounting means including a bracket adjacent each end of said support and fixedly attached to said support and slidably surrounding the adjacent post, an element having a bight and a pair of resilient legs projecting in a diverging relation from said bight adjacent each bracket and having the bight fixedly attached to the adjacent bracket and having the legs frictionally and releasably engaging the adjacent post.

References Cited in the file of this patent
UNITED STATES PATENTS

| | | |
|---|---|---|
| 2,727,492 | Hatcher | Dec. 20, 1955 |
| 2,742,138 | Potter et al. | Apr. 17, 1956 |